United States Patent [19]

Nakajima et al.

[11] Patent Number: 5,138,670

[45] Date of Patent: * Aug. 11, 1992

[54] IMAGE READING APPARATUS CAPABLE OF READING DESIRED IMAGE AREAS

[75] Inventors: Akio Nakajima; Munehiro Nakatani; Masamichi Kishi, all of Osaka, Japan

[73] Assignee: Minolta Camera Co., Ltd., Osaka, Japan

[*] Notice: The portion of the term of this patent subsequent to Jul. 16, 2008 has been disclaimed.

[21] Appl. No.: 717,689

[22] Filed: Jun. 19, 1991

Related U.S. Application Data

[62] Division of Ser. No. 302,577, Jun. 26, 1989.

[30] Foreign Application Priority Data

| Jan. 29, 1988 | [JP] | Japan | 63-21113 |
| Jan. 29, 1988 | [JP] | Japan | 63-21114 |
| Jan. 29, 1988 | [JP] | Japan | 63-21115 |

[51] Int. Cl.$^5$ .............................. G06K 9/00
[52] U.S. Cl. ........................... 382/48; 382/47; 382/61; 358/453
[58] Field of Search .......... 382/47, 48, 61, 65; 358/451, 452, 453, 456

[56] References Cited

U.S. PATENT DOCUMENTS

| 4,384,272 | 5/1983 | Tanaka et al. | 382/65 |
| 4,700,237 | 10/1987 | Yoshioka et al. | 358/451 |
| 4,750,044 | 6/1988 | Nakajima et al. | 358/456 |
| 4,751,376 | 6/1988 | Sugiura et al. | 358/451 |
| 4,807,041 | 2/1989 | Kishi et al. | 358/452 |
| 5,033,102 | 7/1991 | Nakajima et al. | 382/47 |

FOREIGN PATENT DOCUMENTS

| 47-11451 | 4/1972 | Japan . |
| 55-33151 | 3/1980 | Japan . |

Primary Examiner—David K. Moore
Assistant Examiner—Yon Jung
Attorney, Agent, or Firm—Price, Gess & Ubell

[57] ABSTRACT

A plurality of index members are arranged at desired positions on an end portion of a platen glass, the members being movable in a scanning direction of a scanner. A black mark is provided on a rear surface of each index member, and the mark as well as the original are read by an image reader, so that the positions of the index members can be detected. When one of the index members is detected as the scanner is moved, the image signals of the original included in the scanning region of the scanner are not outputted until the next index member is detected. In this manner, by continuously outputting image signals only of the desired areas of the original, the column skip edition can be readily and surely carried out.

13 Claims, 17 Drawing Sheets

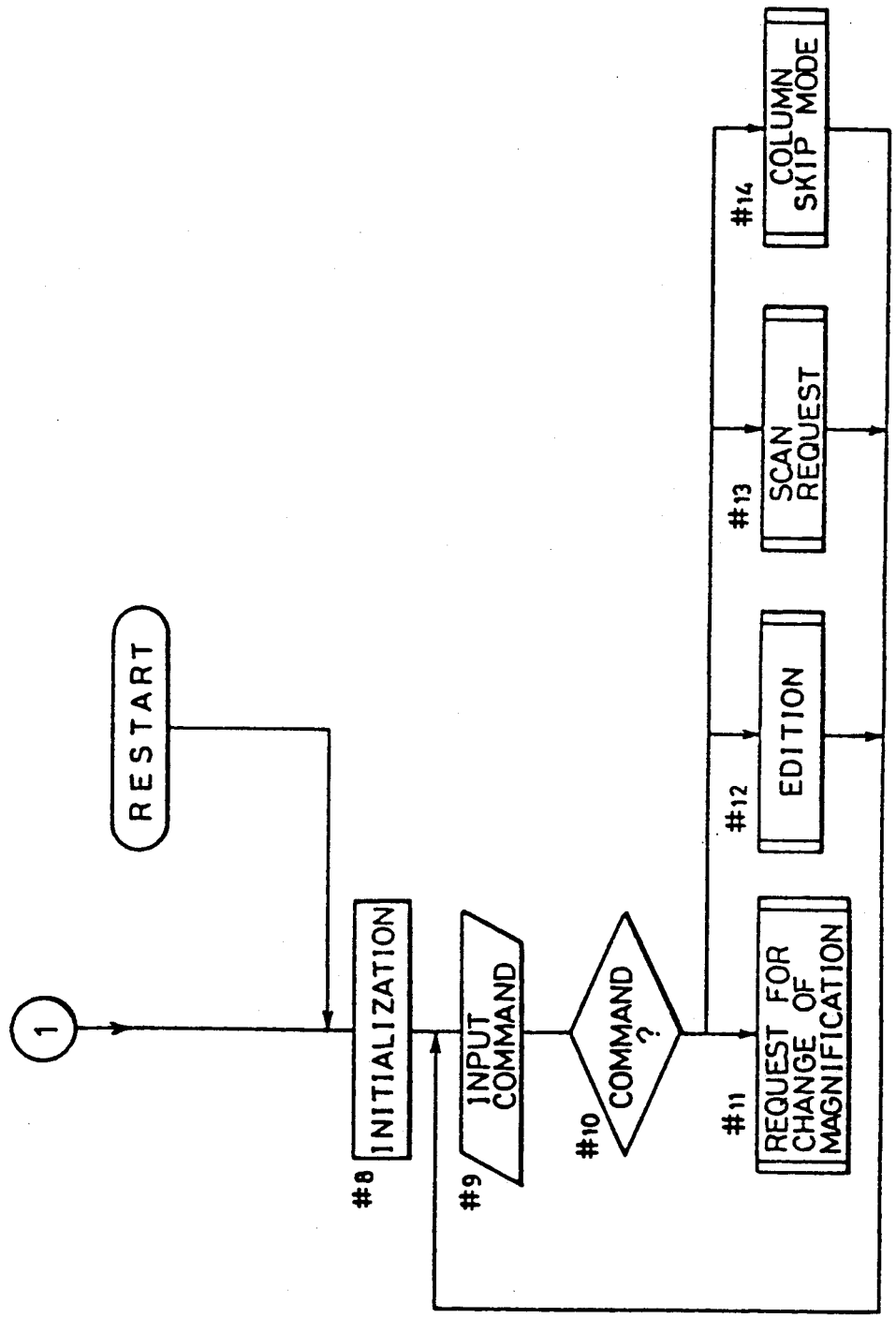

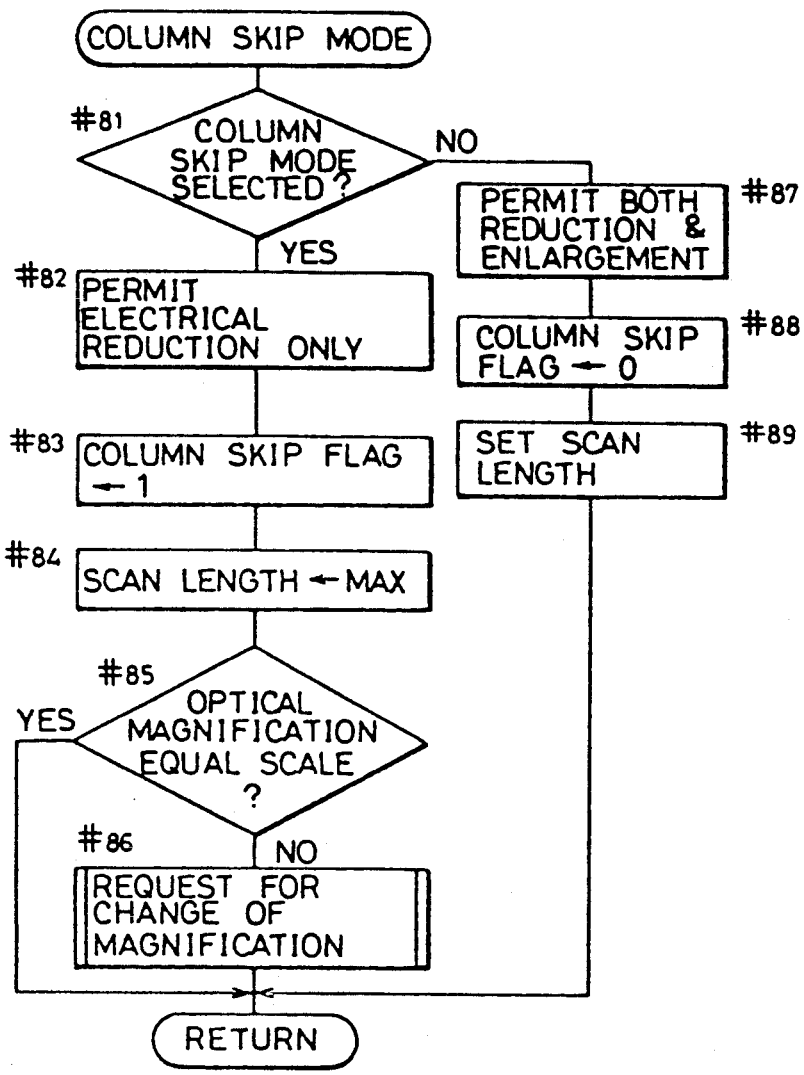
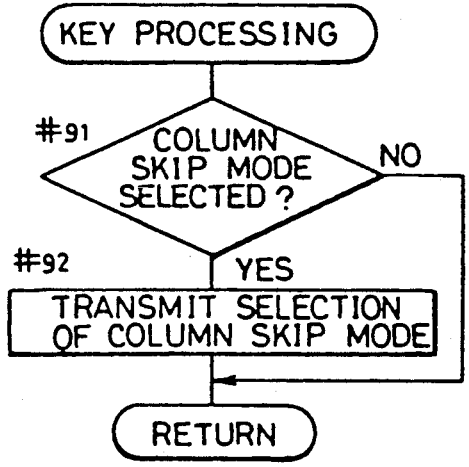

IMAGE READING APPARATUS CAPABLE OF READING DESIRED IMAGE AREAS

This is a divisional application of Ser. No. 302,577, filed on Jan. 26, 1989 now U.S. Pat. No. 5,033,102.

BACKGROUND OF THE INVENTION

1. Field of the Invention

The present invention relates to an image reading apparatus and, more specifically, to an image reading apparatus for reading light reflected from an image surface of an original by means of an image sensor to output image signals of desired areas.

2. Description of the Background Art

Conventionally, image reading apparatuses which read images of an original by means of image sensors and edit the read images variously to output image signals have been used as image input means to computers or as original image reading means for digital type copying machines.

An apparatus has been known as such an image reading apparatus in which one dimensional image sensor comprising image reading elements such as CCDs arranged in a line is placed below a platen glass on which the original is placed, a light source for illumination is moved in a direction (scanning direction) orthogonal to the direction of the arrangement of the image reading elements (array direction), and the light reflected from the original passes through a lens to be received by the one dimensional image sensor.

The image reading apparatus comprises an optical enlarging means which changes the distance between the original and the lens so a to change the size of the image formed on the image sensor for enlarging the original image. Generally, when a copy of equal scale magnification is to be provided, the range in the array direction read by the image sensor extends over both sides of the platen glass and is larger than the maximum width of the original. When an enlarged copy is to be provided by using the optical enlarging means, the range in the array direction read by the image sensor becomes narrower. The range is narrowed down to the central portion of the platen glass as the enlarging magnification is increased.

Now, a digital type copying machine incorporating the above described image reading apparatus and a digital printer has been used for providing an extract from an original of one's resident register or an extract of a copy of one's family register. The extract is provided by copying only the necessary columns of the original, namely, the original of one's resident register or the original of one's family register.

FIG. 14 shows one example of an original of one's family register D1.

The original of one's family register D1 has a margin M of a prescribed width on the right end thereof, a base column A on the left of the margin and columns B to G successively arranged on the left side of the base column A. The base column A is a portion which is always needed to provide an extract of the family register. The number and width of the columns B to G are of various values. The maximum width from the right end to the left end of the columns of the copy D1, that is, the maximum range of images, is generally no more than a prescribed value.

When an extract copy of the family register D1 is to be provided, the base column A and the necessary columns out of the columns B to G must be copied and edited so that they are continuously printed on one paper (this operation is sometimes referred as "column skip edition" or "column skip copying"). For example, when the columns C and F are needed, three columns including these two columns and the base column A are copied by column skip copying, and other columns are not copied.

In the conventional image reading apparatus, the coordinates of four corners of a specified area on the platen glass are inputted by numerical keys provided on an operation panel, and only the image signals in the specified area are outputted as valid out of the images read by the image sensor to provide edition copying of a specified area.

However, in the conventional image reading apparatus, the input of the coordinates of necessary portions (columns) of the original (the copy of the resident register D1) was very troublesome, requiring much time and labor. In addition, miss copies often occur due to erroneous inputs. Even if there is no error in inputs, there was a possibility of a miss copy when the position of the original placed on the platen glass is shifted from the normal position.

Japanese Patent Laying-Open Gazette No. 184047/1986 discloses an image reading apparatus in which a reading start position and a reading end position of the original can be set by a reading range setting portion and only the set range of the original is read by the image sensor. However, in the conventional image reading apparatus, the mechanical structure for reading only the set range by the image sensor becomes complicated. In addition, since the conventional device is for reading only a portion of the original, it is incapable of the above described column skip copying.

SUMMARY OF THE INVENTION

One object of the present invention is to facilitate reading of a desired area in an image reading apparatus.

Another object of the present invention is to carry out column skip edition easily in an image reading apparatus.

A further object of the present invention is to enable column skip edition with a smaller number of miss copies in an image reading apparatus.

A still further object of the present invention is to surely carry out column skip edition regardless of an instruction of enlarged copying magnification in an image reading apparatus having the function of optical enlargement.

A still further object of the present invention is to surely carry out column skip edition of irregular sized originals in an image reading apparatus in which the range of scanning of a scanner can be set corresponding to the originals of regular size or set according to a size of copy paper to be employed.

The above described objects of the present invention can be attained by an image reading apparatus of the present invention which is, in a broad sense, an image reading apparatus for reading images of an image original by means of an image sensor to output the same as image signals, comprising: a platen, optical scanning means, at least two index members, detecting means, output means and control means. An original is placed on the platen. The optical scanning means scans the original placed on the platen, and projects the images on the original onto an image sensor. At least two index members are arranged on an end portion of the platen and they are movable along the scanning direction of the optical scanning means. The detecting means detects respective positions of the index members. The output means outputs image signals read by the image sensor. The control means controls the output means in response to the detected output from the detecting means such that the image signals of an original of the area sandwiched by two of the index members scanned by the optical scanning means are removed and the image signals of indicia on the original included in the areas which are scanned before and after the sandwiched area are successively outputted.

In an aspect, the above described objects of the present invention can be attained by an image reading apparatus for reading images of an original by means of an image sensor to output the same as image signals, comprising a platen, optical scanning means, instructing means, at least two index members, designating means, output means, first control means and a second control means. An original is placed on the platen. The optical scanning means scans the original placed on the platen, projects the images of the original onto the image sensor, the optical scanning means comprising a lens and capable of enlarging the images of the original to project the same by changing the positional relation between the original, lens and the image sensor. The instructing means instructs the enlarged projection by the optical scanning means. At least two index members are arranged on the end portions of the platen and movable along the scanning direction. The designating means switches and designates a column skip mode and a normal mode. The output means outputs image signals read by the image sensor. The first control means controls the output means in response to the detected output from the detecting means such that the image signals of the original of an area sandwiched by two of the index members scanned by the optical scanning means are removed and the image signals of the original of the areas which are scanned before and after the sandwiched area by the scanning means are continuously outputted. The second control means prohibits enlarged projection by the optical scanning means regardless of the instruction of enlarged projection from the instructing means, when the column skip mode is designated by the designating means.

In another aspect, the above described objects of the present invention can be attained by an image reading apparatus for reading images of an original by means of an image sensor to output the same as image signals, comprising a platen, optical scanning means, at least two index members, designating means, output means, first control means and a second control means. An original is placed on the platen. The optical scanning means scans the original placed on the platen and projects the images of the original onto the image sensor. At least two index members are arranged on the end portion of the platen along the scanning direction of the optical scanning means, the members being movable in the direction of scanning. The designating means switches and designates the column skip mode and the normal mode. The output means outputs image signals read by the image sensor. The first control means controls the output means in response to the detected output from the detecting means such that the image signals of the original included in an area sandwiched by two of the index members scanned by the optical scanning means are removed and the image signals of the original included in the areas scanned before and after the sandwiched are continuously outputted. The second control means sets a maximum scanning range by the optical scanning means when the column skip mode is designated by the designating means.

In a broad sense, the image reading apparatus structured as described above is capable of easy image edition with only the desired areas of the original being extracted, merely by setting the index members at desired positions.

In an aspect, in the image reading apparatus structured as described above, even if an enlargement is requested, the request is considered as invalid when column skip edition is to be carried out, so that the edition is carried out.

In another aspect, in the image reading apparatus structured as described above, the scanning range of the scanner is set at a maximum range when the column skip edition is to be carried out, so that the edition can be surely carried out even if the original is of an irregular size.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 15A and 15B are flow charts showing the whole processing operation of the image reader portion in accordance with one embodiment of the present invention;

FIG. 20 is a flow chart showing specific contents of a column skip mode routine shown in FIG. 15B; and FIG. 21 is a flow chart showing a key processing operation of a system controller in association with the column skip mode in accordance with one embodiment of the present invention.

DESCRIPTION OF THE PREFERRED EMBODIMENTS

The embodiments of the present invention will be described in the following with reference to the figures.

Figure 9:
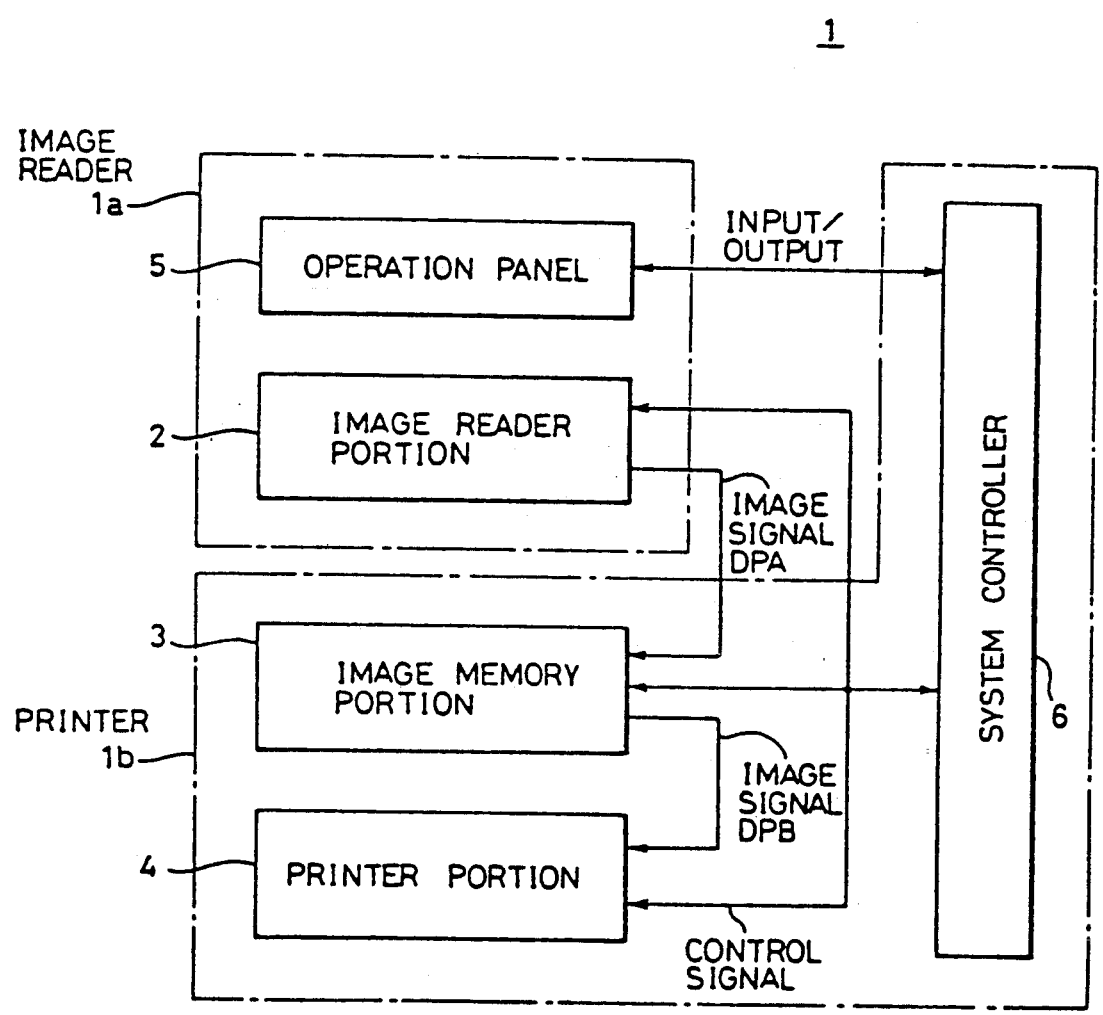
FIG. 9 is a block diagram showing a schematic structure of a digital copying machine in accordance with one embodiment of the present invention.

FIG. 9 is a block diagram showing a schematic structure of a digital copying machine 1.

The digital copying machine 1 comprises an image reader portion 2 which reads images of an original placed on a platen glass to output digital image signals DPA; an image memory portion 3 for carrying out image edition based on the image signals DPA outputted from the image reader portion 2; a printer portion 4 for printing images on a paper based on image signals DPB from the image memory portion 3; an operation panel 5 on which arranged are various keys and display portions for operating the digital copying machine 1; and a system controller 6 for exchanging control signals between each of the portions and for inputting and outputting operation signals and display signals to and from the operation panel 5.

The printer portion 4 is a laser beam printer employing a laser diode, a polygon mirror and the like. The image memory portion 3 and the system controller 6 are mounted in a box of the printer portion 4, hence the printer 1b is constituted by the printer portion 4, the image memory portion 3 and the system controller 6.

The operation panel 5 is attached to an upper front portion of a box of the image reader portion 2, hence the image reader 1a comprises the image reader portion 2 and the operation panel 5. The image reader 1a is placed on the printer 1b and is electrically connected thereto by cables.

Figure 1:
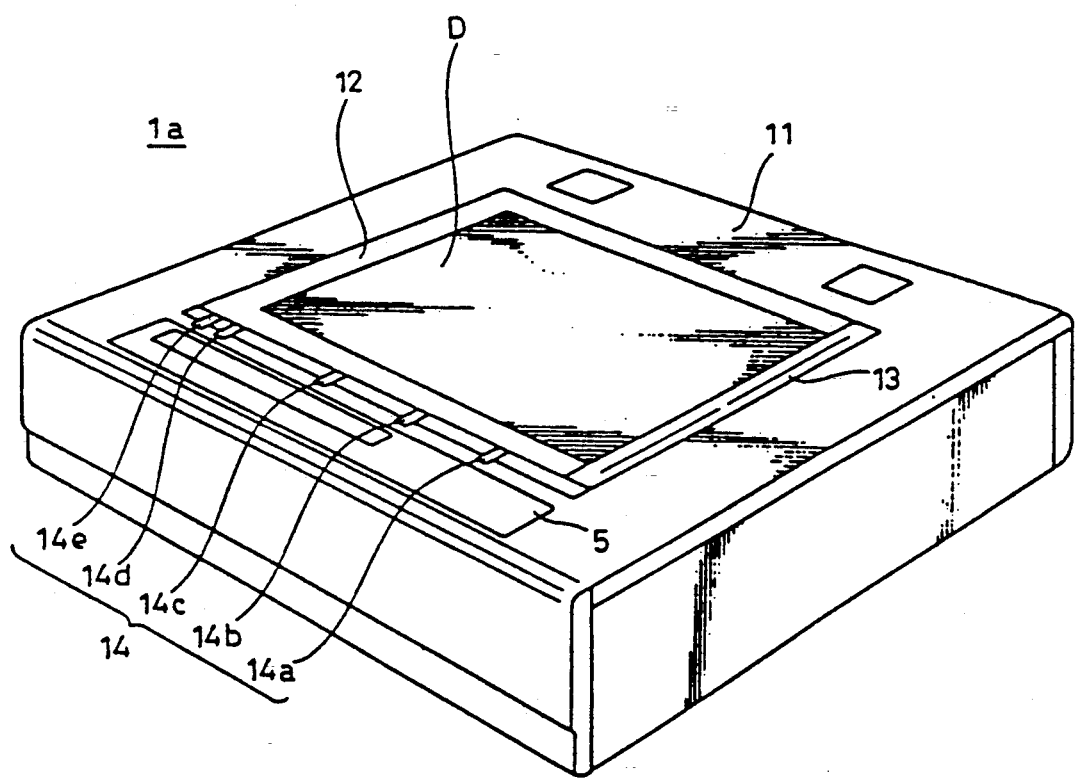
FIG. 1 shows an appearance of an image reader in accordance with one embodiment of the present invention.

FIG. 1 is a perspective view showing the appearance of the image reader 1a.

The image reader 1a comprises a platen glass 12 attached on an upper surface of a rectangular box 11 on which an original D is placed; an original scale 13 provided along side end portion of the platen glass 12; and index levers 14a to 14e movable in the direction of scanning of the optical system and arranged along a front end portion of the platen glass 12. The index levers 14 designate portions of the original D which are to be copied and portions of the original which are to be skipped (the copy of which portions are not necessary) when a column skip copying, which will be described later, is to be carried out. A pattern 47 for detecting magnification and focus are formed on the rear surface of the original scale 13, which will be described later. In FIG. 1, an original cover is omitted.

Figure 2:
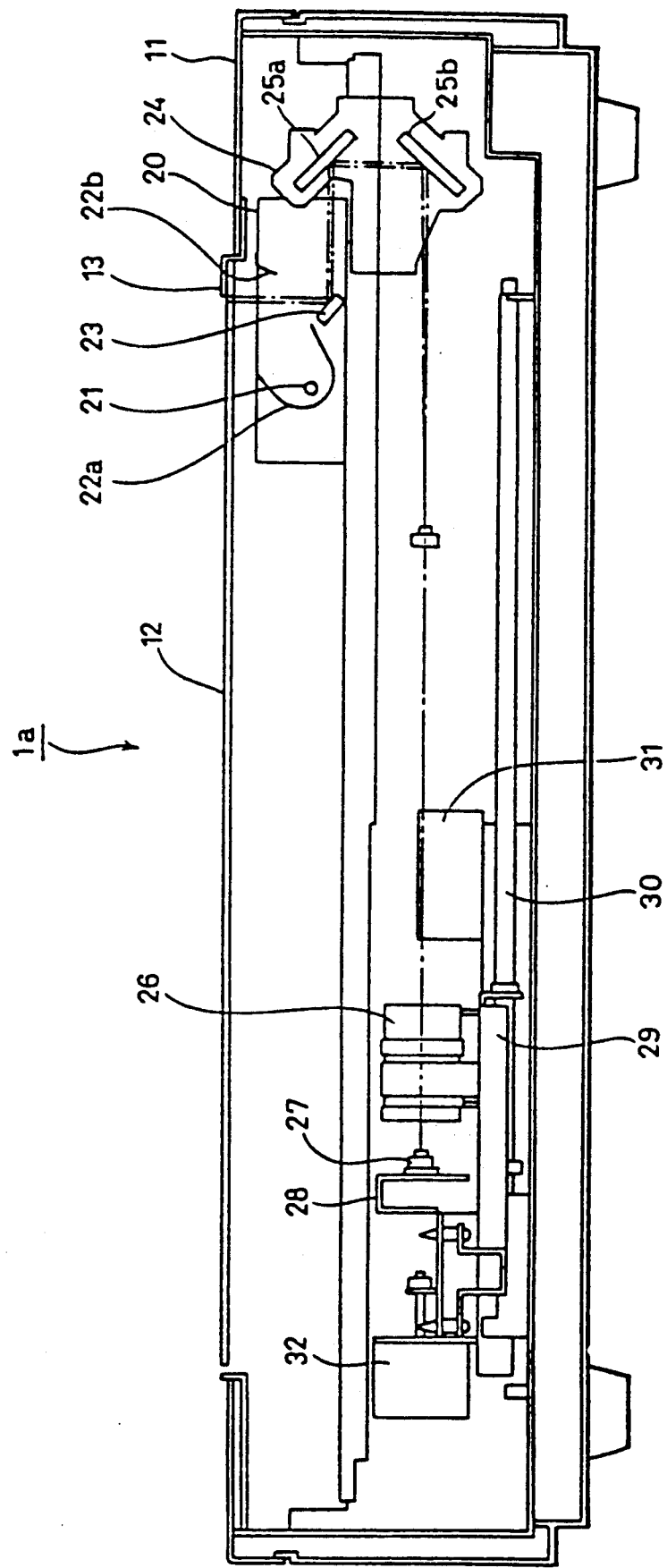
FIG. 2 is a cross sectional view along the direction of scanning showing a schematic structure of the image reader of FIG. 1.

FIG. 2 is a cross sectional view along a subscanning direction showing the schematic structure of the image reader 1a.

The light from a halogen lamp 21 which is an exposure source are converged by reflecting mirrors 22a and 22b to irradiate the original D placed on the platen glass 12. The light reflected from the original D is successively reflected by the mirrors 23, 25a and 25b, passes through the lens 26 and enters an image sensor 27 constituted by one dimensional CCDs.

The image sensor 27 is long in the horizontal direction and receives light from valid image areas in the width direction (perpendicular to the scanning direction) of the platen glass and from the index levers 14a to 14e provided out of the valid image regions extended in both end portions. The image sensor outputs image signals from the original D as well as detecting signals for detecting the positions of the index levers 14a to 14e.

The image sensor 27 is supported by a support portion 28 and its position and angle are adjustable. The support portion 28 and the lens 26 are fixed on a carriage 29. The magnification is adjusted by moving the carriage 29 along a guide bar 30 in the direction of the optical axis by means of a lens motor 31 based on a lens magnification signal from a CPU 64, which will be described later.

The focus adjustment is carried out by moving the support portion 28 in the direction of the optical axis by means of a focusing motor 32 fixed on the carriage 29.

In reading images of the original D, a scanner 20 comprising the halogen lamp 21, reflecting mirrors 22s and 22b and the mirror 23 carries out optical scanning by moving by a prescribed distance in the left as viewed in FIG. 2 (scanning direction). On this occasion, a slider 24 comprising mirrors 25a and 25b moves in the similar manner at a half velocity of the scanner 20.

Figure 3:
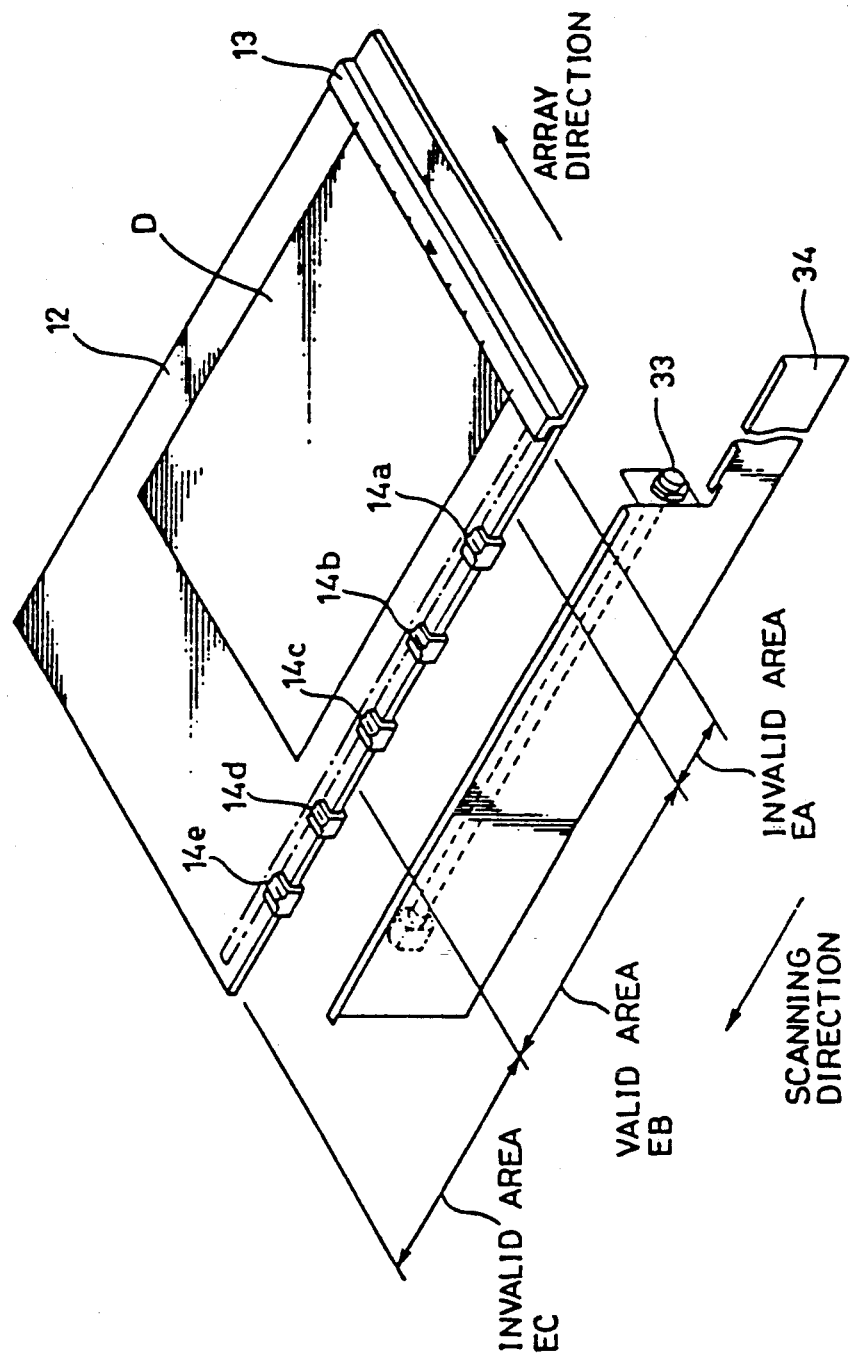
FIG. 3 is a perspective view showing the platen glass and index levers of FIG. 1.

FIG. 3 is a perspective view showing the states of the index levers 14a to 14e and the platen glass 12.

The index levers 14a to 14e can be moved over the entire length of front end portion of the platen glass 12. The platen glass 12 is divided into a valid area EB in which area designation by the index levers 14a to 14e is valid, and invalid areas EA and EC which are rest positions of the index levers in which area designation by the index levers 14a to 14e is invalid.

FIG. 3 also shows illuminating lamp 33 and a reflecting plate 34 of the illuminating lamp 33 provided below the index levers 14a to 14e in the box 11. The illuminating lamp 33 is turned on for a prescribed time period by pressing an illumination key 82 when the column skip edition, which will be described later, is to be carried out, so that the images of the original D can be seen through the rear surface, thereby facilitating setting of the index levers 14a to 14e.

Figure 4:
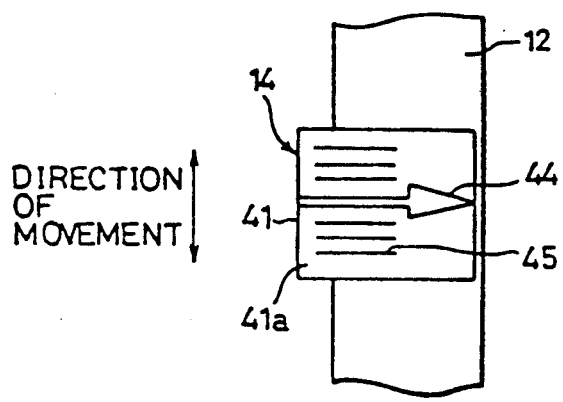
FIG. 4 is a plan view showing the index lever of FIG. 3 in an enlarged view.
Figure 5:
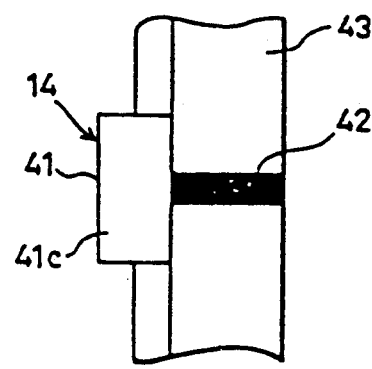
FIG. 5 is a bottom view showing the index lever of FIG. 3 in an enlargement.
Figure 6:
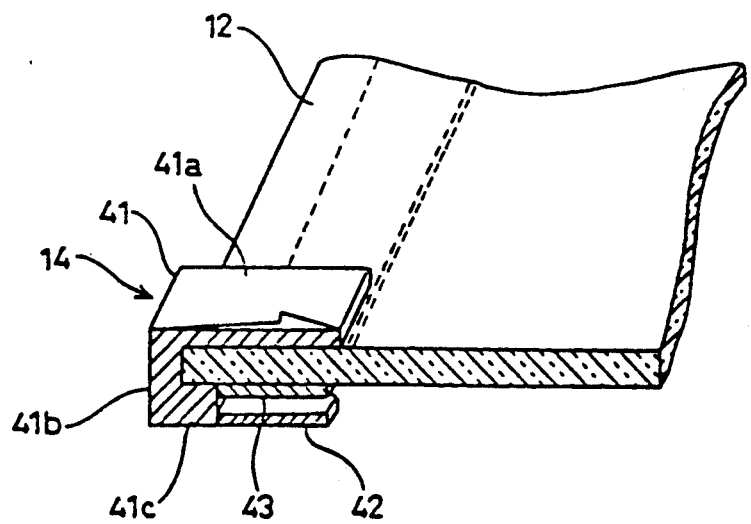
FIG. 6 is a perspective cross sectional view showing the cross section at the center of the index lever of FIG. 3.

FIGS. 4 and 5 are plan view and bottom view, respectively, showing the index lever 14 which is enlarged for convenience, and FIG. 6 is a cross sectional perspective view showing the cross section of the central portion of the index lever 14.

The index lever 14 comprises a lever body 41 including an upper piece 41a, a central piece 41b and a lower piece 41c which is shorter than the upper piece 41, and a black marker 42 fixed to an end portion of the lower piece 41c.

The lever body 41 sandwiches the platen glass 12 by means of the upper piece 41a and the lower piece 41c and is movable along the front end portion in that state. An arrow 44 for facilitating exact positioning and convex stripes 45 for facilitating easy movement of the lever 14 by one's finger are formed on the upper surface of the upper piece 41a.

A white reflecting tape 43 is applied at a portion corresponding to the track of the marker 42 on the lower surface of the platen glass 12. The positions of the reflecting tape 43 and of the marker 42 in the scanning direction which are the same as the reading position of the original D are irradiated by the halogen lamp 21 during scanning of the scanner 21. Therefore, when the scanner 20 reaches the position of the marker 42, the light reflected therefrom is considerably reduced. By detecting the change of the reflected light, the positions of the index levers 14a to 14e can be detected, which will be described later.

Figure 7:
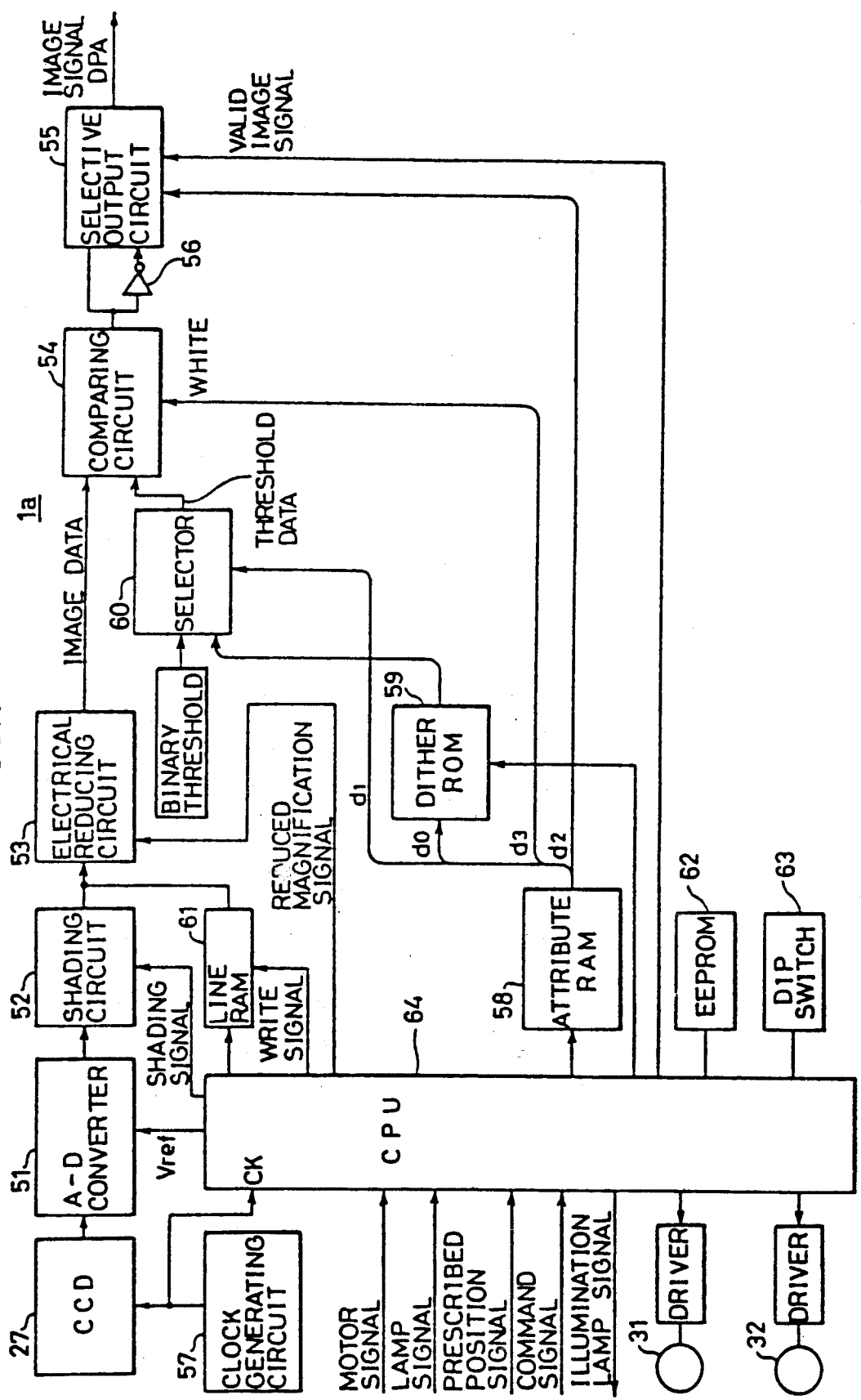
FIG. 7 is a block diagram showing an electric circuit of an image reader portion of FIG. 1.

FIG. 7 is a block diagram showing an electric circuit of the image reader portion 2.

The electric circuit of the image reader portion 2 comprises an A-D converter 51 which converts analog output signals from the image sensor 27 to image data of digital signals; a shading circuit 52 for correcting uneven light intensity in the array direction of the image data and for compensating variations between bits of the image sensor 27; an electrical reducing circuit 53 for reducing images by thinning out image data; a comparing circuit 54 for comparing the image data with threshold data from a selector 60 to output binary signals; a selective output circuit 55 for outputting binary signals from the comparing circuit 54 as image signals DPA to the printer 1b based on the valid image signals from the CPU 64; an inverter 56 for applying inverted signals of the binary signals to the selective output circuit 55; a clock generating circuit 57 for applying clock signals to the image sensor 27 and to the CPU 64; an attribute RAM 58 for storing attribute data; a dither ROM 59 storing two patterns of thresholds of a dither pattern 1 and a dither pattern 2; a selector 62 for selecting and transmitting binary threshold data or the threshold data from the dither ROM 59 based on the attribute data to the comparing circuit 54; a line RAM 61 for storing output signals of one scanning line from the shading circuit 52 to provide image information of 1 line to the CPU 64; an EEPROM for storing the focal length f and the magnification rate of the lens 26; a DIP switch 63 for setting operation modes; and a CPU 64 for controlling all these components.

A motor signal, a lamp signal, a prescribed position signal, a command signal, an illumination lamp signal and so on are inputted and outputted to and from the CPU 64. The input and output from respective keys and indicating portions of the operation panel 5, which will be described later, are also carried out to and from the CPU 64. The CPU 64 controls other input apparatuses, displaying apparatuses and other control apparatuses which are not shown.

Figure 8:
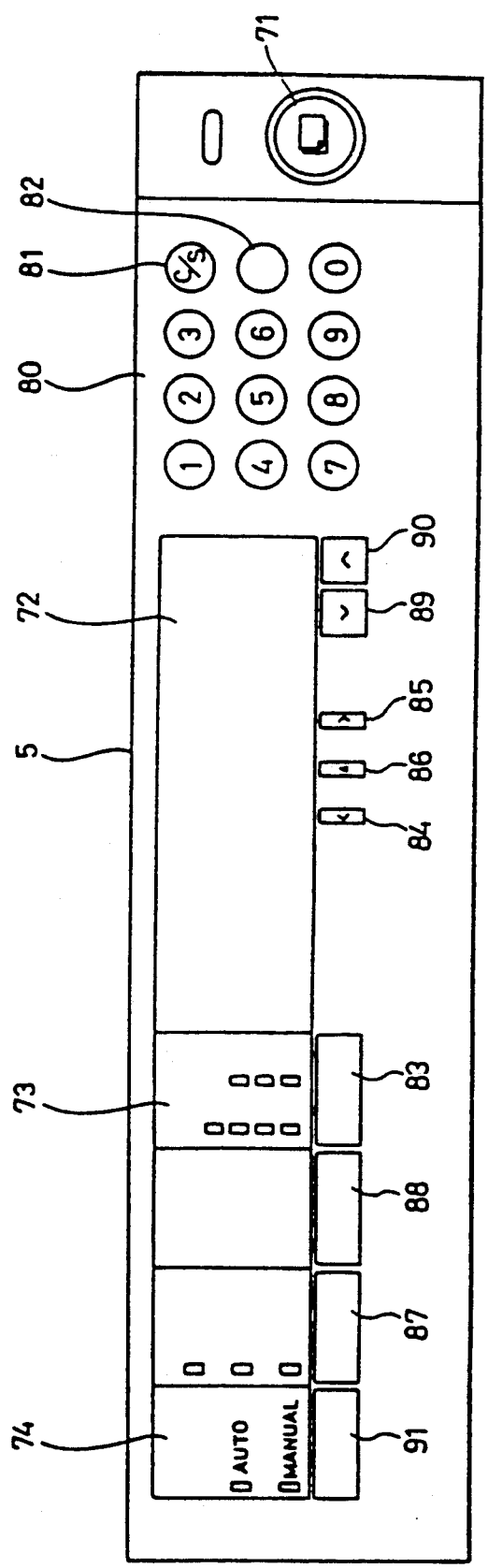
FIG. 8 is a front elevation of an operation panel in accordance with one embodiment of the present invention.

FIG. 8 is a front view of the operation panel 5.

On the operation panel 5 arranged are: a print key 71 for starting copying operation; display portions 72 for displaying information of the number of copies, copying magnification rate, copying density, troubles and so on; ten keys 80 comprising ten numerical keys from 0 to 9 for inputting the number of copies and other values for setting; a clear stop key 81; an illumination key 82 for turning on the illuminating lamp 33; a paper selection key 83; a paper displaying portion 73 displaying the size of the selected paper; an up key 84 and a down key 85 for manually changing the copying density; a density adjusting mode selecting key 86 for switching manual and automatic density adjustment modes; a magnification selecting key 87 for selecting and setting copying magnification; an equal scale magnification key 88 for selecting equal scale magnification; a reduction correction key 89 and an enlargement correction key 90 for increasing and decreasing copying magnification rate by minute amount; a column skip mode selecting key 91 for switching a column skip mode for carrying out column skip copying (with automatic paper selection or manual paper selection) and a normal mode; and a column skip mode displaying portion 74 for displaying that the operation is in the column skip mode and either the manual paper selection or automatic paper selection in the column skip mode.

The magnification and focus adjustment will be described in the following.

Figure 10:
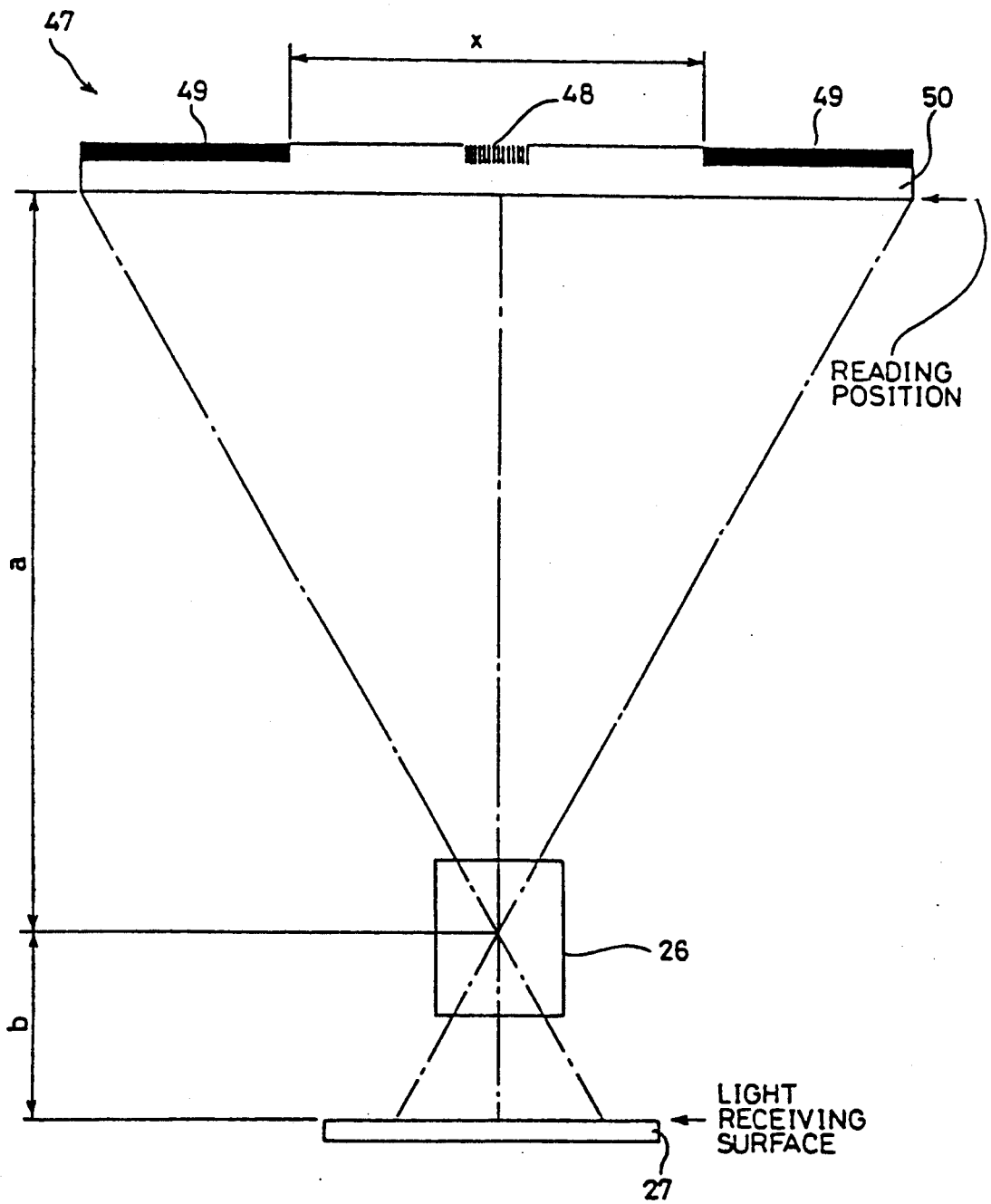
FIG. 10 shows a pattern for detecting magnification and focus in accordance with one embodiment of the present invention.

FIG. 10 shows a pattern 47 for detecting magnification and focus.

The pattern 47 is provided on the rear surface of the original scale 13. The pattern comprises a focus adjusting pattern 48 including black vertical stripes provided at constant intervals at the central portion of the original scale 13 and magnification adjusting patterns 49 of black lateral bars provided on both sides of the pattern 48 spaced apart from each other by a prescribed distance x. A white pattern 50 for shading correction is provided beside the pattern 47 on the side of the original.

When the scanner 20 reaches the pattern position directly below the pattern 47, the pattern 47 is irradiated by the halogen lamp 21, the light reflected therefrom is received by the image sensor 27 and the magnification and focus are adjusted in accordance with the state of the image.

More specifically, the inside edge of the magnification adjusting pattern 49 is detected by the image sensor 27 and by measuring the length on the image sensor 27 corresponding to the distance x, the magnification rate can be evaluated. And therefore, the lens 26 is moved by lens motor 31 so that the evaluated magnification rate is adjusted to be the set magnification rate.

Signals corresponding to the focus adjusting pattern 48 picked u by the sensor 27 will be alternately the maximum and minimum binary values corresponding to the white and black of the focus adjusting pattern 48 when it is in-focus. However, the contrast becomes weak as the lens goes out of focus, the maximum value becomes smaller and the minimum value becomes larger when the signal moderately changes continuously between the two values.

Therefore, the focus adjustment is carried out by moving the image sensor 27 by means of the focusing motor 32 such that the difference between the white level and the black level becomes largest with a prescribed threshold being a center.

Now, a distance a between the lens 26 and a reading position of the original D (pattern 47) and a distance b between the lens 26 and a light receiving surface of the image sensor 27 satisfy the following conditions in the in-focus state.

$$a = f(1 - 1/L\beta) \quad (1)$$

$$b = f(1 - \beta/L) \quad (2)$$

where f ... focal length of the lens 26
L ... reading magnification rate
β ... lens reduction rate in reading Therefore, when a specified magnification rate (for example, equal scale magnification rate) is once set and the focus adjustment is carried out in accordance with the above described method, and thereafter, the magnification rate is to be changed, the distances a and b after the change of magnification are calculated based on the equation (1) or (2), and the lens motor 31 and the focusing motor 32 are controlled accordingly.

The image editing operation by the attribute RAM 58 and the like shown in FIG. 7 will be described in the following.

Attribute data for editing a plurality of areas of the images on the original D are written in the attribute RAM 58. Each of the areas can be designated by a unit of 1 mm×1 mm, for example.

The attribute data comprises 4 bits (d3, d2, d1 and d0), respectively representing the attribute information shown in Table 1.

TABLE 1

| (Attribute Information) | |
|---|---|
| d3 | white/valid pixel |
| d2 | reversal/non-reversal |
| d1 | binary/Dither |
| d0 | Dither pattern 1/Dither pattern 2 |

Namely, a bit of d0 designates either of two dither patterns. A bit of d1 designates either binary processing or dither processing. A bit of d2 designates reversal of black and white. A bit of d3 designates blankness.

By using the four bits attribute data shown in Table 1, eight attributes shown in Table 2 will be provided.

TABLE 2

| (Attribute Data) | |
|---|---|
| 00XX | white |
| 01XX | black |
| 100X | binary |
| 1010 | Dither 1 |
| 1011 | Dither 2 |
| 110X | reversal, binary |
| 1110 | reversal, Dither 1 |
| 1111 | reversal, Dither 2 |

The edition of images such as masking, trimming, white/black reversal, binary/halftone selection can be effected in accordance with the attribute data set in the attribute RAM 58.

The dither ROM 59 is selected based on the attribute data and generates threshold value of the dither pattern 1 or the dither pattern 2 in response to the value of the attribute information d0, with the threshold value generated as a (m×n) matrix. The selector 60 selects either the threshold value from the dither ROM 59 or a binary threshold value in accordance with the attribute information d1 to transmit the same to the comparing circuit 54. More specifically, if the attribute is dither, it selects the data from the dither ROM 59, and if the attribute is binary, it selects the data of binary threshold value, to transmit the same to the comparing circuit 54.

The comparing circuit 54 compares the image data with the threshold value from the selector 60 and transmits the result to the selection output circuit 55. When the attribute information d3 is "0", it transmits white data. The selection output circuit 55 also receives an inverted signal of the output signal from the comparing circuit 59 inverted by the inverter 56, and it selects either the reversal or non-reversal data in response to the attribute information d2 to output the same to the printer 1b in synchronization with the valid image signal. The valid image signal is turned on and off every time one of the index levers 14a to 14e is detected when column skip edition is to be carried out in the column skip mode, as will be described later.

These operations are carried out in correspondence with one reading operation of the original D by the above mentioned image reader portion 2. Namely, the image data in the area of the original D corresponding to areas designated by the attribute RAM 58 are processed based on the attribute information of the respective areas.

The edition by using the above described attribute RAM 58 is carried out visually monitoring images printed (copied) on a paper by the printer 1b or by visually monitoring displays on a CRT displaying apparatus for monitoring, not shown.

The column skip edition in the column skip mode will be described in the following.

Figure 14:
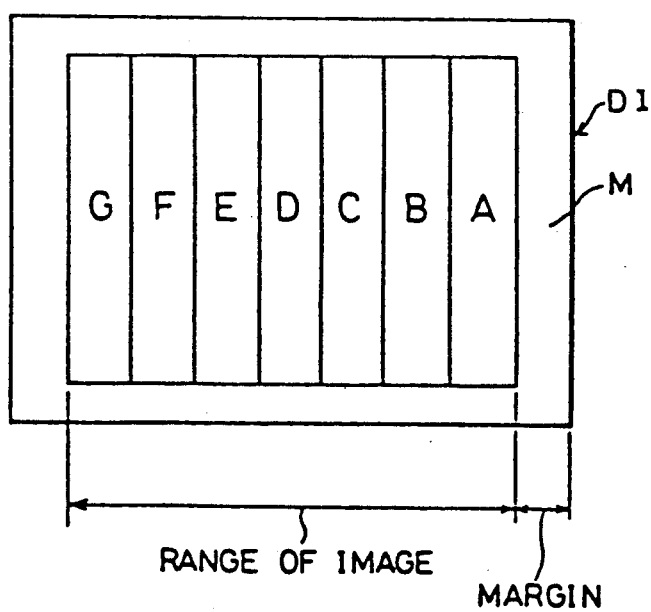
FIG. 14 is one example of the column arrangement of the copy of one's family register shown in FIG. 12.

The column skip edition means an operation for forming an extract from the original of one's resident register or from the original of one's family register, for example, as described in association with the background art, in which only the base column A and the necessary ones of the columns B to G of the original of one's family register D1 shown in FIG. 14 are continuously copied on one paper, for example. The digital copying machine 1 of the present embodiment is capable of column skip edition in a simple manner with the original set on the platen glass 12, so that neither the attribute RAM 58 nor visual monitoring of images on screen is required.

In carrying column skip edition, the column skip mode is selected by a column skip mode selecting key 91 and the index levers 14a to 14e are set at desired positions corresponding to the positions of columns or transverse boundaries of the original D. Description will be given of a case in which the base column A and the columns C and F of the original D1 are edited and copied.

Figure 12:
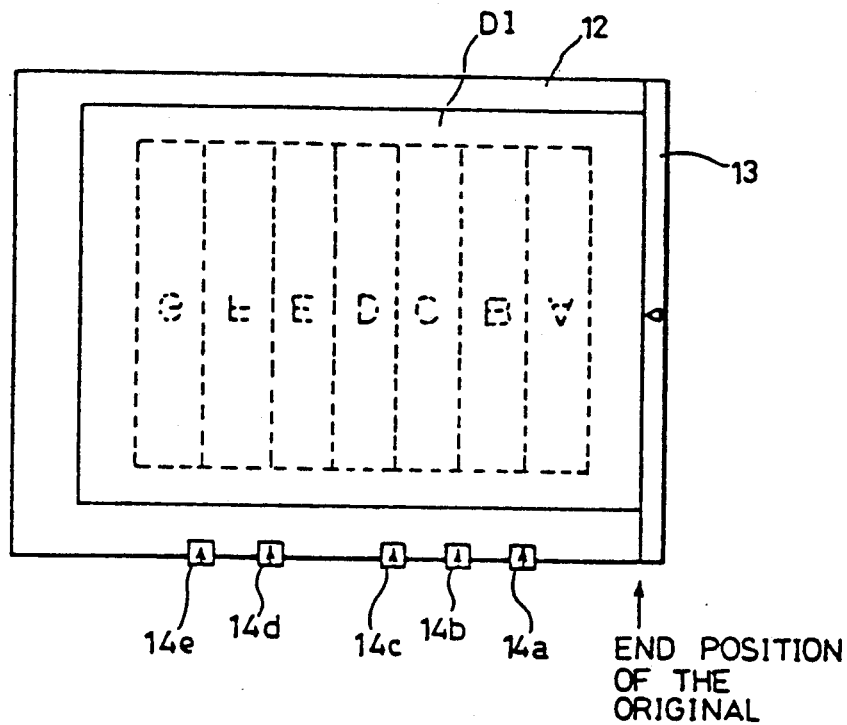
FIG. 12 is a plan view showing a copy of one's family register placed on the platen glass in accordance with one embodiment of the present invention.

FIG. 12 is a plan view showing the original of one's family register D1 placed on the platen glass 12.

The original of one's family register D1 is placed in a normal state with the image surface (on which information is written) facing downward and the right end (the side of the base column A) abutting on the original scale 13. The index levers 14a to 14e are set at respective borders between the base columns A and the column B, the columns C and D, the columns E and F, and the columns F and G.

Figure 11:
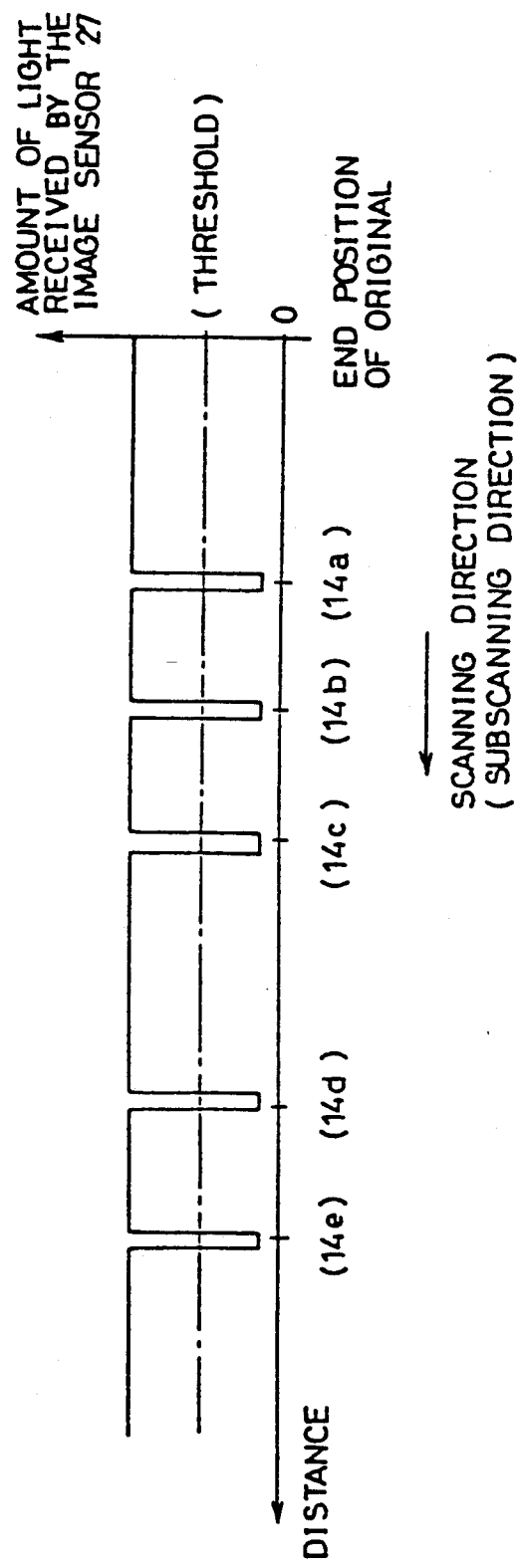
FIG. 11 shows the amount of light received by the image sensor in correspondence with reflecting zones in scanning in accordance with one embodiment of the present invention.

When scanning is carried out by the scanner 20 in this state, the whole image surface of the family register D1 is read by the image sensor 27 and the output signals are inputted to the selective output circuit 55 through the A-D converter 51, the shading circuit 52, the electrical reducing circuit 53 and the comparing circuit 54. At the same time, the light reflected from the reflecting zone 43 is received by an end portion of the image sensor 27. Although the reflecting zone 43 is white, the positions of the index levers 14a to 14e are black as there are markers 42 at these positions. The level of the outputs from the image sensor 27 for the portions along the reflecting zone 43 abruptly changes at the positions of the index levers 14a to 14e, as shown in FIG. 11.

The signals are converted into digital values by the above described A-D converter 51 to be compared with the data of the approximately central threshold, so that the portions of the markers 42 are recognized as "black" and other portions of the reflection zone 43 are recognized as "white" by the CPU 64.

The width of the marker 42 in the scanning direction is 6 mm. The central position of each of the index levers 14a to 14e, namely, 3 mm from the detection of "black" of the marker in the scanning direction, is defined as a set position of each of the index levers 14a to 14e.

Among the output signals from the image sensor 27, the image signals of the original D1 are distinguished from detection signals of the index levers 14a to 14e by means of addresses based on the clock signals (horizontal synchronizing signals) generated from the clock generating circuit 57.

The image signals read by the image sensor 27 in the above described manner are subjected to various processes to be inputted to the selective output circuit 55. These signals are outputted from the selective output circuit 55 when the scanner 20 reaches the end position of the original and the valid image signal is turned on. Thereafter, the scanner reaches the position of the first index lever 14a, the valid image signal is turned off to stop the output. When the scanner reaches of the second index lever 14b, the image signals are again outputted. In the similar manner, every time the scanner 20 reaches the position of each of the index levers 14c to 14e, the valid image signal is switched between on and off, so that whether the image signals DPA from the selection output circuit 55 are to be outputted or not is switched accordingly. Namely, in the column skip mode, the output of the image signals DPA is started from the end position of the original, and whether the image signals are to be outputted or not is switched at the positions of the index levers 14a to 14e.

Figure 13:
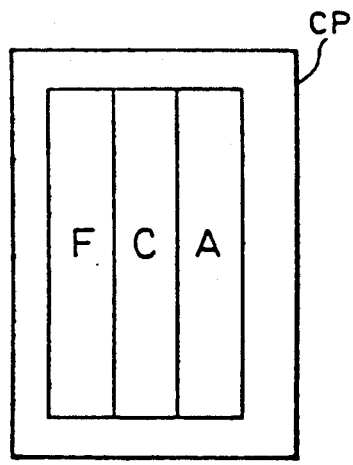
FIG. 13 shows an extract formed from the copy of the family register shown in FIG. 12.

FIG. 13 shows an extract CP formed in accordance with the above described method from the original of the family register D1.

The extract CP comprises the base column A and the columns C and F of the copy of the resident register provided by column skip copying. The size of the extract CP is on half of the original copy of one's resident register D1. The size of the extract CP may be varied by first setting manual paper selection of column skip mode by means of the column skip mode selection key 91 and then by selecting a paper of a desired size by means of a paper selection key 83.

Meanwhile, when automatic paper selection is set by the key 91, the whole images are once read, the size of the images to be outputted is determined, and the paper size is automatically selected based on the determined size and the designated magnification rate. In that case, the user does not have to select the size of papers. However, since the printing operation starts after the completion of image reading, the time required for the process become longer to some extent.

In the foregoing, description was given of a case in which all of the index levers 14a to 14e were used. When only one column is to be copied or when necessary columns are continuous to each other, four or less index levers 14 are used.

In such cases, the unnecessary index levers 14 are moved to the invalid areas EA and EC (FIG. 3) on both sides in the subscanning direction. When the index levers 14a to 14e are in the invalid areas EA and EC, the switching of the valid image signals is not carried out even if the markers 42 of the index levers are detected by the sensor 27.

For example, the invalid area EA is provided on an end portion of the original scale 13, more specifically, extending from the end portion of the original D over about 30 mm, and the length of the valid area EB is about 320 mm. These lengths are sufficient for providing extracts of almost all of the resident registers and family registers.

As can be seen from the foregoing, the index levers 14a to 14e have the same structure. Therefore, any one of these levers can be used. For example, when the index lever 14a is moved to the invalid area EA and the index lever 14b is positioned in the valid area EB, the scanner 20 detects the index lever 14b at first, so that the output of the image signals EPA is turned off.

In accordance with the above described embodiment, the column skip copying in which the necessary columns of one's family register D1 (original) is continuously copied on one paper can be exactly carried out at high speed. Therefore, disadvantages of the prior art such as long time and much labor for inputting coordinates, generation of miss copies derived from erroneous inputs or from shifts of the original can be eliminated.

When the index levers 14a to 14e are to be set at prescribed positions, the illuminating lamp 33 is turned on for a prescribed time period by pressing an illumination key 82, so that the state of the image surface can be seen through the rear surface thereof, even if the original D is thick. This enables exact setting of the index levers at prescribed positions with the original being turned upside-down facilitating the setting of the levers.

Since invalid areas EA and EC as rest areas for the index levers are provided in the range in which the levers 14a to 14e can be moved, only the necessary numbers of the index levers 14 are used for designating the areas of the column skip edition, and the index levers 14 which are not used need not be removed from the apparatus. This structure is very convenient.

Copies of various scale magnification in the column skip mode will be described in the following.

The digital copying machine 1 of the present embodiment is capable of providing enlarged copies as well as reduced copies. However, in the column skip mode, the enlargement is prohibited, and the machine is capable of providing reduced copies and the copies of equal scale magnification.

First, mechanism for providing enlarged copies and reduced copies will be described in the following.

In providing enlarged copies, the enlargement in the direction perpendicular to the scanning direction is carried out by changing the distance a between the reading position of the original D and the lens 26 by moving the lens 26 by means of the lens motor 31 so that the images formed on the image sensor are enlarged, as described with reference to FIG. 10. The enlargement in the scanning direction is carried out by reducing the velocity of scanning of the scanner 20 by a prescribed rate in association with the velocity in providing copies of equal scale magnification.

In providing reduced copies, the reduction in the direction perpendicular to the scanning direction is carried out by thinning out image data obtained by the image sensor in the same manner as in providing copies of the equal scale magnification by means of an electrical reducing circuit 53. The reduction in the scanning direction is carried out by increasing the scanning velocity of the scanner 20 by a prescribed rate in association with that in providing copies of equal scale magnification. This operation is reverse to that in providing enlarged copies.

More specifically, the enlargement and reduction in the scanning direction are both carried out by changing the velocity of scanning. As for the enlargement in the array direction, optical enlargement is employed, and as for the reduction in the direction perpendicular to the scanning direction, electrical reduction is employed.

Now, when the optical enlargement is carried out, the range of the original D in the array direction read by the image sensor 27 becomes narrow. Consequently, the index levers 14a to 14e and the markers 42 placed out of the valid image area can not be detected by the image sensor 27.

Therefore, when the column skip mode is selected, the enlargement is prohibited. If the enlarged magnification rate has been selected, the magnification rate is forced to be 1.

The length of scanning of the scanner 20 in the column skip mode will be described in the following.

As is understood from the foregoing, the column skip mode is to provide an extract from an original of one's resident register or an original of one's family register. Papers of irregular size (for example 280×390, 275×380) are often used for the originals of resident registers and family registers. These are different from the regular A or B sized papers.

Therefore, if the scanner 20 reads images in the range corresponding to the original of the regular size in the column skip mode, there is a possibility that some images of the original of one's family register or one's resident register are not read. In the column skip mode, an original of an irregular size which is long in the longitudinal direction (scanning direction) are often used. Therefore, if the reading is carried out for the ranges corresponding to the regular sized papers only, in accordance with the automatic detection of the original size or in accordance with the size determined by the selected paper and the copying magnification, not all of the images of the original D are read. More specifically, there is a possibility that the images of the necessary portions (columns) designated by the index levers 14a to 14e are not outputted.

In view of the foregoing, in the image reader 1a of the present embodiment, the scan length of the scanner 20 is selected to be maximum regardless of the size of the original D in the column skip mode, so that the scanner scans over the entire length of the platen glass.

Therefore, no matter where the necessary portions (columns) of the irregular sized original D such as the originals of one's resident registers or one's family registers is placed in the scanning direction, there will be no miss copies, and proper copies can be provided. Consequently, the troubles of shifting the original D or taking copies for many times can be eliminated.

The above described edition and copying operation will be described in the following with reference to the flow charts.

FIGS. 15 to 20 are flow charts showing the processing operation in the CPU 64 and FIG. 21 is a flow chart showing the operation of the system controller 6.

Figure 15A:
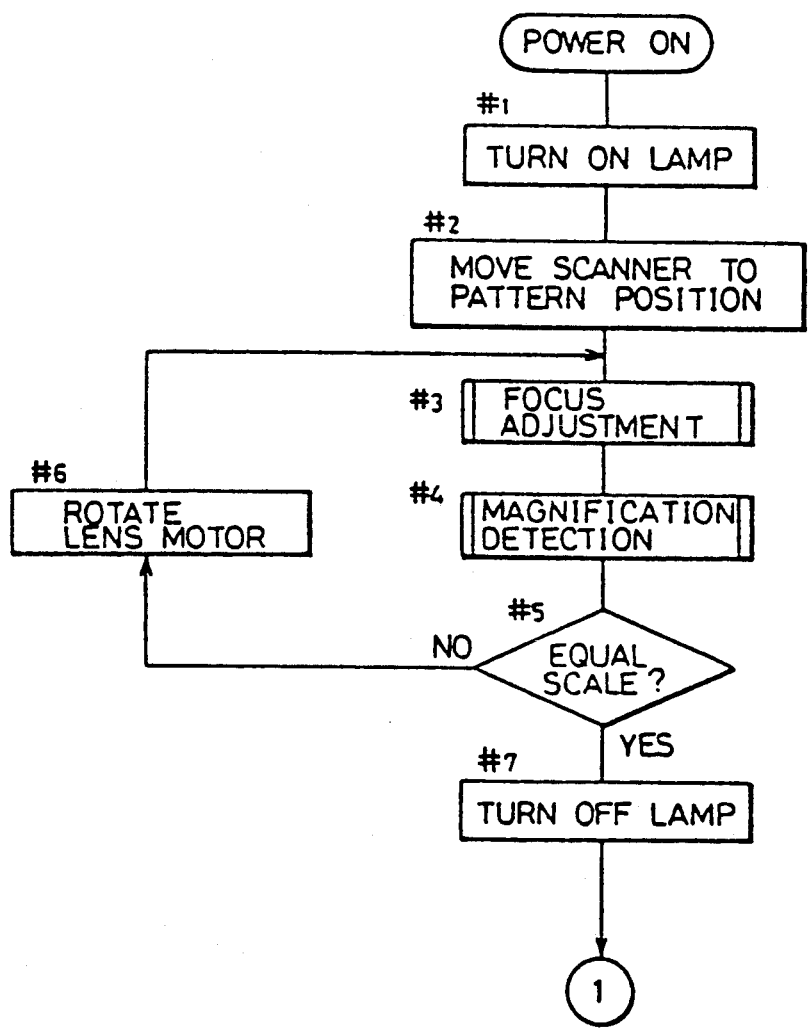

FIGS. 15A and 15B are flow charts showing the whole processing operation of the image reader portion 2.

When the power is turned on, the halogen lamp 21 is turned on (step #1) and the scanner 20 is moved to the position of the pattern 47 for adjusting the magnification rate and focus (step #2).

Thereafter, focus adjustment is carried out by the focusing motor 32 (step #3) and the magnification rate is detected (step #4). If it is not the equal scale magnification (NO in step #5), the lens motor 31 is rotated in the direction of the equal scale magnification (step #6), and the focus adjustment and detection of the magnification rate are repeated. By doing so, the magnification rate is set at the equal scale and in-focus state is realized, and thereafter the halogen lamp 21 is turned off (step #7).

Thereafter, initialization of the attribute RAM 58 and the like is carried out (step #8) and the flow stops until a command is transmitted from the system controller 6.

When a command is inputted (step #9), the flow branches to a routine for requesting change of magnification rate (step #11), edition routine (step #12), a scan request routine (step #13) and the column skip mode routine (#14).

In the edition routine, the designated attribute such as masking, trimming, reversal, half tone and so on are written into the attribute RAM 58. Other routines will be described in the following.

Figure 16:
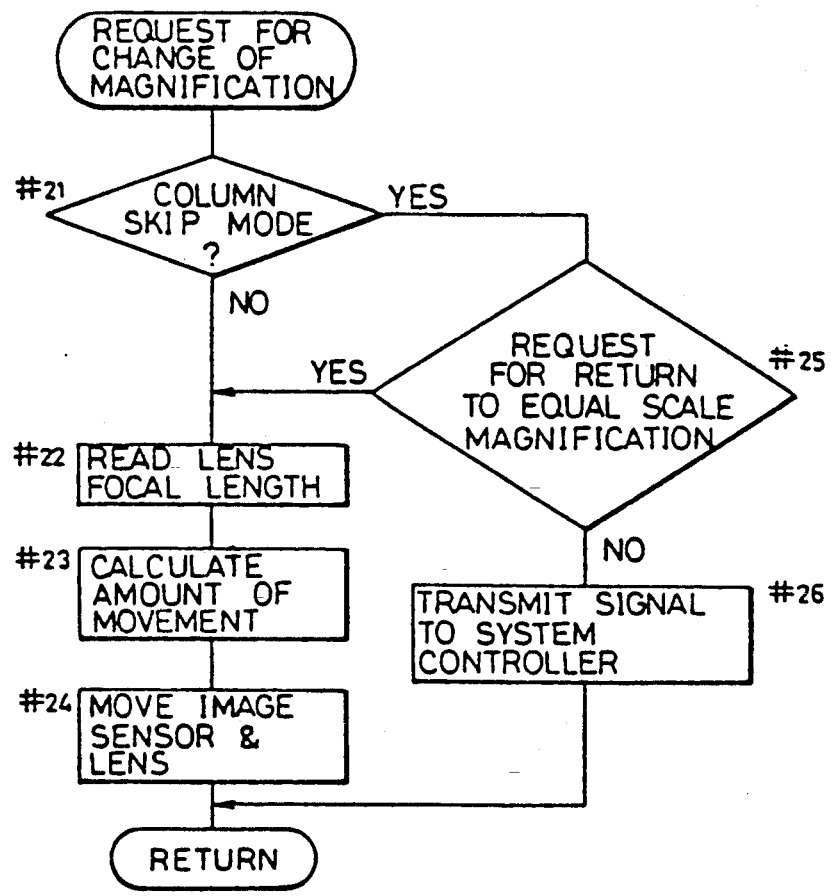
FIG. 16 is a flow chart showing specific contents of a routine requesting change of magnification of FIG. 15B.

FIG. 16 is a flow chart showing the routine for requesting change of magnification rate.

When this routine is called, the magnification rate to be set (enlarged magnification rate or equal scale magnification rate) is transmitted as a parameter.

At first, whether it is in the column skip mode or not is determined by checking the column skip flag (step #21).

If it is not in the column skip mode, the focal length f of the lens 26 is read from the EEPROM 62 (step #22), and the amount of movement of the lens 26 and the image sensor 27 are calculated based on the focal length f, the set magnification rate, and on the present magnification rate of the optical system (step #23). Thereafter they are moved by the lens motor 31 and the focusing motor 32 (step #24).

If it is in the column skip mode, whether the request for changing the magnification is a request for a return to the equal scale magnification or not is determined (step #25). If it is YES in step #25, the optical system is returned to the positions for the equal scale magnification by executing the steps following the step #22. If it is NO in the step #25, namely, if it is a command for requesting change to the enlarged magnification rate, a signal is transmitted to the system controller 6 (step #26) so as to inform the user that only the equal scale magnification is available, namely, the enlarged magnification rate is unavailable.

Meanwhile, if the routine for requesting change of magnification rate is called in the column skip mode routine shown in FIG. 20, the answer to the question in the step 25 will be always YES. Otherwise the answer will depend on the magnification rate transmitted as a parameter at that time.

Although not shown, when providing a copy of reduced magnification, the optical system is forced to the positions for the equal scale magnification, and a reduced magnification signal is transmitted to the electrical reducing circuit 53.

Figure 17:
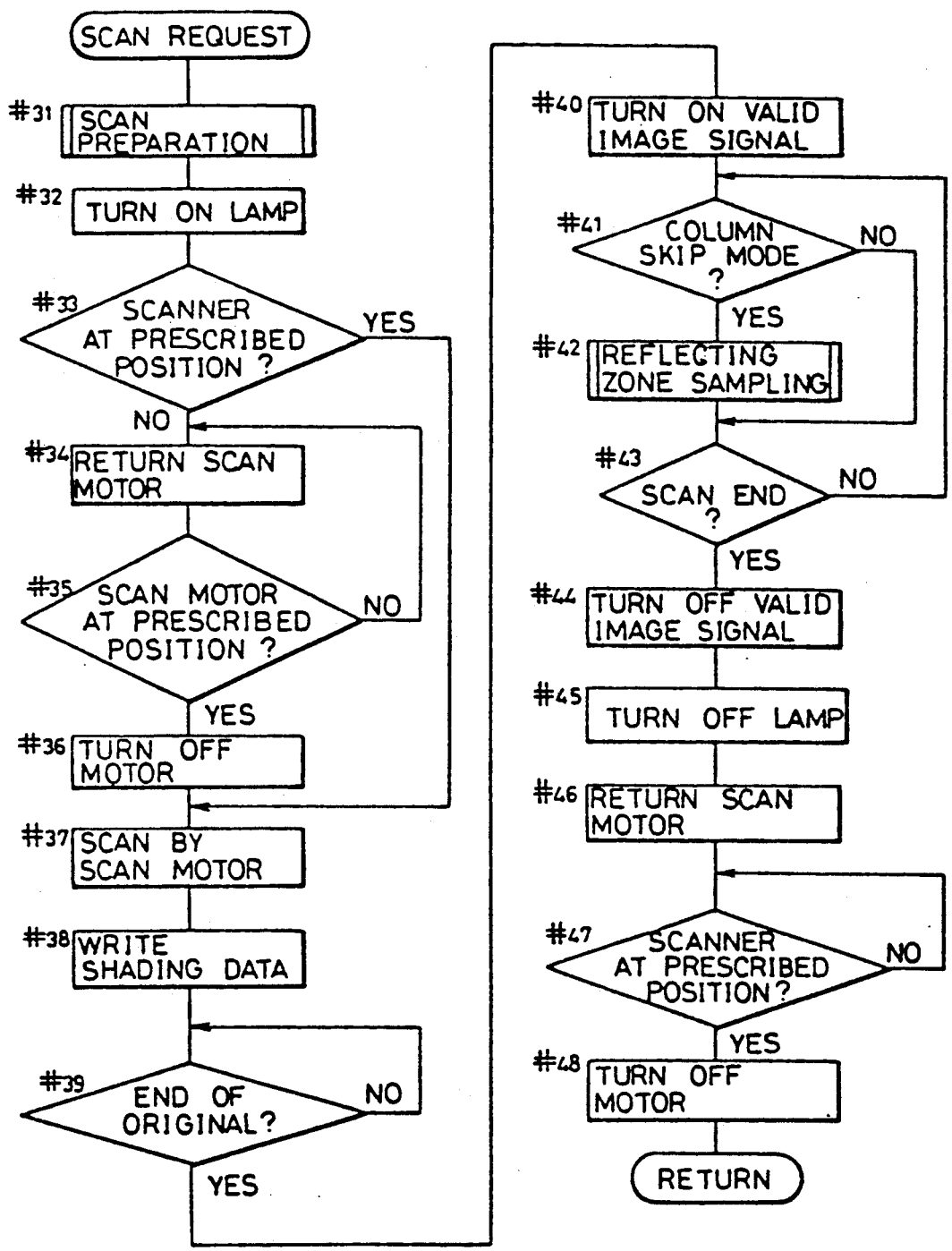
FIG. 17 is a flow chart showing specific contents of the scan request routine of FIG. 15B.

FIG. 17 is a flow chart of the above described scan request routine.

At first, a scan preparing routine is executed (step #31). This routine will be described later.

Thereafter, the halogen lamp 21 is turned on (step #32) and whether the scanner 20 is at a prescribed position or not is determined based on the state (on/off) of a prescribed position switch, not shown (step #33). If the scanner is not at a prescribed position, a scan motor, not shown, is moved in the returning direction to the prescribed position (steps #34 and 35) and the scan motor is stopped (step #36).

Thereafter, the scanner 20 is moved to the white pattern 50 on the original scale 13 by means of the scan motor (step #37), and the shading data is written into the RAM in the shading circuit 52 (step #38). The shading corrected image data is provided from the data and the image data from the A-D converter 51.

Then, the scanner 20 is moved to the end position of the original by means of the scan motor (step #39). If the distance of movement has been known in advance, the scanning can be surely carried out exactly from the end position of the original even when the variable scale magnification is selected.

When the optical system reaches the end position of the original, the valid image signal is turned on to output the image signals DPA from the selective output circuit 55 (step #40).

Whether it is in the column skip mode or not is determined (step #41) and, when it is in the column skip mode, a reflecting zone sampling routine, which will be described later, is executed (step #42).

Thereafter, when the scanner 20 reaches the position of the selected scan length (step #43), the valid image signal is turned off to stop the output of the image signals DPA (step #44). Thereafter, the halogen lamp 21 is turned off (step #45), the scanner 20 is returned to the prescribed position by the scan motor (steps #46 and #47), and the scan motor is stopped (step #48).

Figure 18:
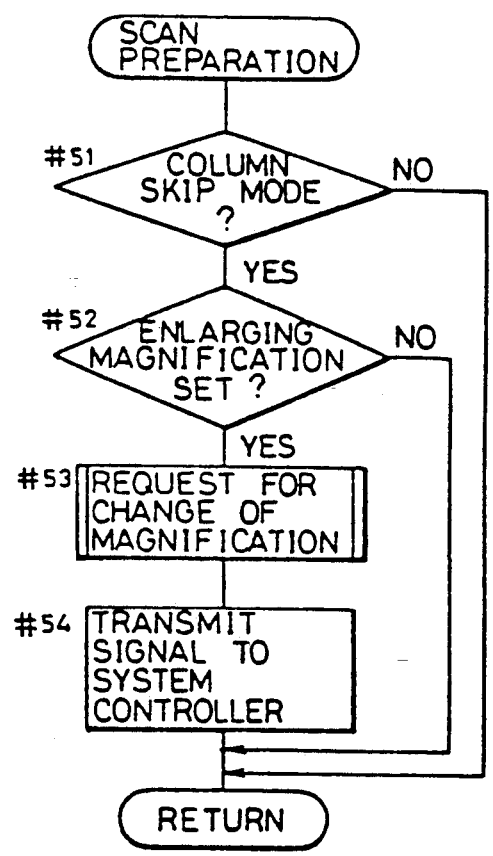
FIG. 18 is a flow chart showing specific contents of prescanning processing routine of FIG. 17.

FIG. 18 is a flow chart of the above mentioned scan preparing routine.

First, whether it is in the column skip mode or not is determined (step #51), and if it is not in the column skip mode, the flow directly returns to the main flow.

If it is in the column skip mode, whether the enlarged magnification rate is set in the optical system or not is determined (step #52), and if it is YES, the routine for requesting change of magnification is called, with the request for returning the equal scale magnification being a parameter (step #53). Consequently, the optical system is forced to the equal scale magnification, and thereafter, a signal is transmitted to the system controller 6 so as to inform the user that a magnification rate which is different from the enlarged magnification rate set by the magnification selecting key 87 or the like is set (step #54). The system controller 6 displays the change of the setting of the magnification rate on the displaying portion 72 of the operation panel in response to this signal.

Figure 19:
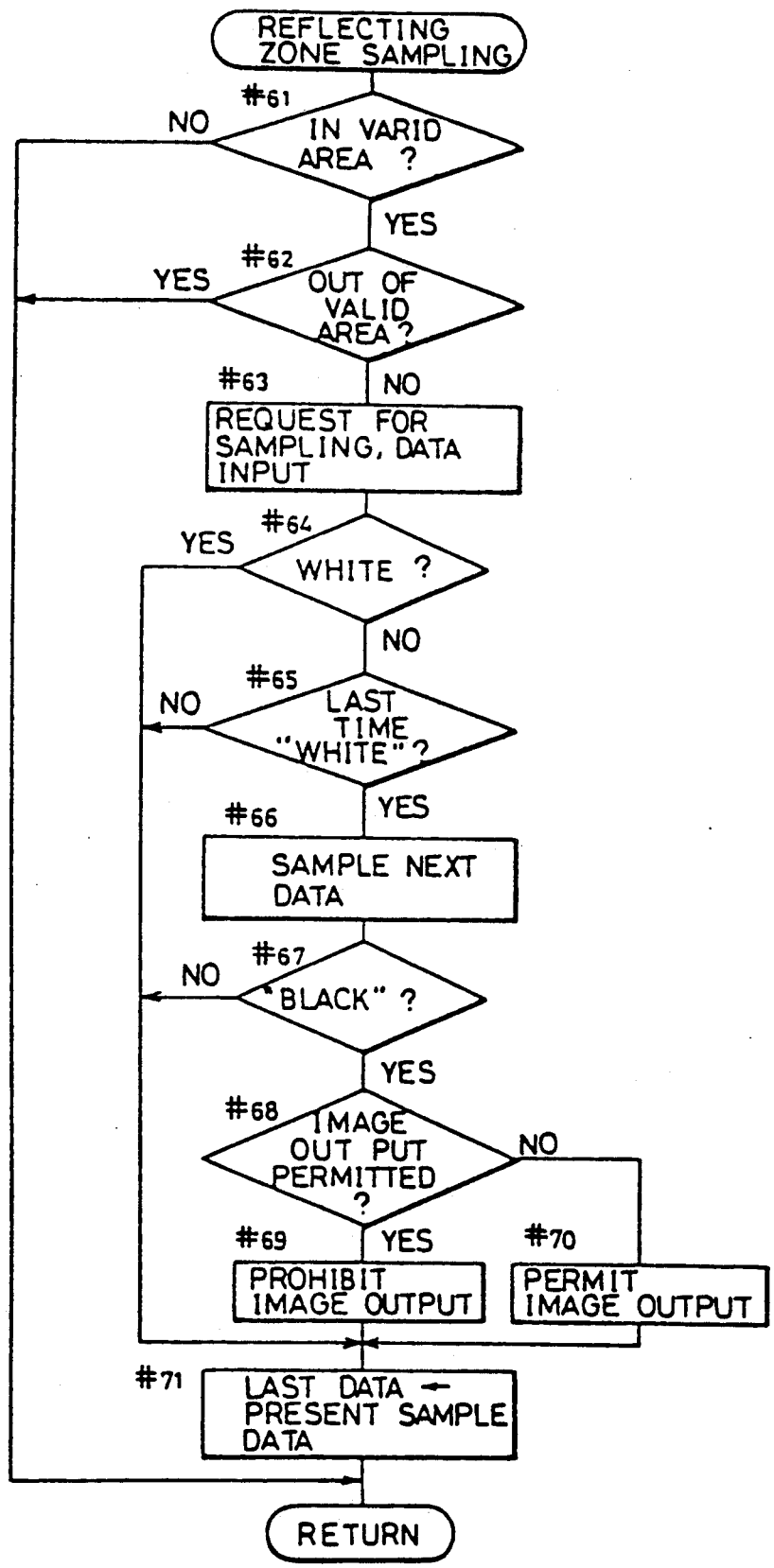
FIG. 19 is a flow chart showing specific contents of reflecting zone sampling routine of FIG. 17.

FIG. 19 is a flow chart of the above mentioned reflecting zone sampling routine.

First, whether the position of the scanner 20 is in the valid area EB or not is determined (steps #61 and 62) and if it is out of the valid area EB, the flow directly returns to the main flow. The determination whether the scanner 20 is in the valid area EB or not is carried out by checking the distance of movement of the scanner 20 from the end position of the original.

Thereafter, the data of the portion of the reflecting zone 43 detected by the end portion of the image sensor in the valid area EB is sampled, and the data is inputted to the CPU 64 (step #63). Thereafter, whether the data sampled this time is "white" or not is determined (step #64). When it is YES, that is, when the marker 42 is not detected, the flow jumps to the step #71 and the "white" data sampled at this time is stored in register storing the data of the last time.

If it is NO, namely, if the data sampled this time is "black", whether the data sampled last time was "white" or not is determined (step #65). If it is NO, the flow jumps to the step #71 and the "black" data sampled this time is stored in the register storing the data of the last time.

If it is YES in the step #65, namely, the data of the last time was "white" and the data of this time is "black", the next data is sampled (step #66) and whether it is "black" or not is determined (step #67). If it is NO, namely, if it is "white", the flow jumps to the step #71. By doing so, erroneous detection caused by noise or the like can be prevented.

If it is YES in the step #67, namely, the data of this time and of the last time are both "black", whether the output of the image signals is permitted at present or not is determined (step #68). If the output has been permitted, the output is prohibited. On the contrary, if the output has been prohibited, the output is permitted (steps #69 and 70).

By this routine, the state (on/off) of the valid image signal from the CPU 64 is switched every time the marker 42 is detected in the valid area EB, whereby on/off of the outputs of the image signals DPA from the selective output circuit 55 is switched.

Meanwhile, before the execution of the routine, namely, before the start of scanning for reading images, the data checked at first in the step #65 is initially set at "white", and the output of the image signals is initially permitted.

FIG. 20 is a flow chart of the column skip mode routine of the step #14 of the main flow shown in FIG. 15B.

First, whether the column skip mode is selected or not is determined based on a mode signal transmitted from the system controller 6 (step #81), if it is YES, only the electrical reduction is permitted (step #82), the column skip flag for setting the column skip mode is set at "1" (step #83), and the scan length is set at the maximum length (step #84). Thereafter, whether the magnification rate of the optical system at that time is equal scale or not is determined (step #85). If it is the equal scale magnification, the flow directly returns to the main flow. However, if it is not the equal scale magnification, namely, if an enlarged magnification has been selected, then the routine for requesting change of magnification is called using the request for returning to the equal scale as a parameter in order to force the magnification to the equal scale (step #86).

If it is NO in the step #81, the enlargement and reduction are both permitted (step #87), and the column skip flag is set at "0" (step #88). The scan length is selected to be the length calculated from the magnification rate and the employed paper size in the step #89.

FIG. 21 is a flow chart showing the key processing operation of the system controller 6 in association with the column skip mode.

In this routine, whether the column skip mode is selected or not by the column skip mode selecting key 91 is determined (step #91). If it is selected, the selection of the column skip mode is transmitted to the image reader portion 2 (step #92).

In the above embodiment, five index levers 14a to 14e are provided. Four or less or six or more index levers may be provided. The structures of the body 41 of the lever and of the marker 42 of the index levers 14a to 14e may be changed. The colors of each of the marker 42 and the reflecting zone 43 may be different from the above described colors. The light reflected from the marker 42 and from the reflecting zone 43 may be detected by optical sensors other than the image sensor 27.

Setting means other than the column skip mode selecting key 91 for selecting the column skip mode may be employed, such as a pair of a column skip mode setting key and a column skip mode cancel key.

In the above described embodiment, the output from the selective output circuit 55 is turned on and off to switch the outputs of the image signals at the positions of the index levers 14a to 14e. The image data of the original D read by the image sensor 27 may be all stored once in an image memory provided separately, and the on/off control may be carried out in reading from the image memory.

In the above embodiment, the setting of the column skip mode is carried out by operating a key on the operation panel 5. The setting of the column skip mode may be carried out by a command from a host computer, for example, and when a command of a column skip mode is transmitted and the optical system is set at an enlarged magnification, the command of the column skip mode is rejected indicating the setting at the enlarged magnification rate, or the command may be received after the magnification rate is reset at the equal scale magnification.

In the above embodiment, when the column skip mode is set, the magnification rate is forced to be the equal scale magnification, or the enlarged magnification rate cannot be set. However, the enlarged magnification may be accepted in a range in which the positions of the index levers 14a to 14e can be detected by the image sensor 27.

According to the present invention, the image edition for reading and outputting images of necessary portions of an original can be readily and surely carried out.

When the operation of the image switching means is made valid, the enlargement by the optical enlarging means over a prescribed magnification rate is prohibited, so that the positions of the index levers can be surely detected by the image sensor, and the detecting operation of the detecting means is carried out without fail.

Consequently, the column skip edition of the original of one's resident register or one's family register can be surely carried out to provide an extract therefrom. Therefore, the disadvantages of the prior art such as the time and labor required for inputting the coordinates, the erroneous inputs and the miss edition caused by shifts of the originals can be eliminated.

If the operation of the image switching means is made valid, the scanner is adapted to scan the maximum possible length. Therefore, even when the original is an irregular size, the whole image surface thereof can be read and proper edition can be carried out no matter where the required portions of the original are placed in the scanning direction. As a result, there is no need of repeating copying operation or shifting the position of the originals, greatly facilitate the copying operation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reading apparatus for reading images of an original by means of an image sensor for outputting the same as image signals, comprising:
   a platen in which the original is placed;
   optical scanning means for scanning the original placed on said platen;
   means for changing a magnification ratio for determining the size of outputted images with respect to the size of the original, the original having indicia that can be defined by columns;
   designating means for designating a magnification ratio other than an equal magnification ratio;
   mode setting means for setting and switching between a column skip mode and a normal mode of operation;
   means for indicating columns to be imaged and columns to be deleted in the column skip mode in a direction normal to the scanning direction;
   output means for outputting image signals read by said image sensor;
   first control means for controlling said output means such that the image signals of the original included in a scanning area corresponding to the columns indicated to be deleted are removed and the image signals of the original included in a scanning area corresponding to the columns indicated to be retained are continuously outputted, and
   second control means for causing said magnification changing means, when the column skip mode is designated by said designating means, to prohibit the change of the magnification ratio from the equal magnification ratio.

2. The invention of claim 1 further including means for providing a printed copy of the edited image signals.

3. The invention of claim 2 wherein the retained image signals are reproduced adjacent each other to eliminate any space that was originally occupied by the deleted columns.

4. An image reading apparatus for reading images from an original having indicia that can be defined by transverse boundaries relative to the scan direction whereby an editing of the indicia can be accomplished, comprising:
   a platen for receiving an original;
   optical scanning means for scanning the original on the platen;
   means for enabling an editing mode of operation;
   means for designating transverse boundaries relative to indicia on the document to be respectively removed and retained, and
   means for generating edited image signals in correlation with the optical scanning means and the designating means, the boundaries enabling at least an initial output of image signals, a subsequent deletion of image signals and a subsequent output of image signals whereby intermediate image signals in the scan direction can be deleted.

5. The invention of claim 4 wherein the platen includes means for indicating the transverse boundaries along the scan length of the document.

6. The invention of claim 4 further including means for providing an output of the edited image signals wherein the subsequent output of image signals is juxtapositioned adjacent the initial image signals to effectively skip the desired deleted image signals.

7. The invention of claim 5 wherein the means for indicating the transverse boundaries include a first indicator to start a deletion of image signals and a second indicator to stop the deletion and to again start an output of image signals to be retained.

8. The invention of claim 6 further including means for reproducing the edited image signals to provide a printed copy of an edited original with the initial and subsequent image signals aligned adjacent each other in the scan direction.

9. In a copying machine having an image reading apparatus for reading images from an original including indicia extending across a potential scan direction of the original that can be subdefined by transverse boundaries relative to the scan direction whereby an editing of the indicia can be accomplished, a platen for receiving an optical, optical scanning means for scanning the original on the platen, and means for enabling an editing mode of operation, the improvement comprising:

means for designating transverse boundaries relative to intermediate indicia on the document to be removed, the intermediate indicia is preceded by and succeeding by other indicia that is to be retained;

means for generating edited image signals in correlation with the optical scanning means and the designating means, the boundaries enabling at least an initial output of image signals, a subsequent deletion of intermediate image signals and a subsequent output of image signals whereby intermediate image signals in the scan direction can be deleted, and means for outputting a copy of the edited indicia.

10. The invention of claim 9 wherein the means for outputting the edited indicia provides the succeeding and preceded indicia juxtapositioned adjacent each other to effectively skip the intermediate indicia.

11. The invention of claim 10 further including a series of indicators along the scan direction of the platen to define the transverse boundaries, the first indicator starting a deletion of image signals and a subsequent second indicator stopping the deletion and starting an output of image signals to be retained.

12. The invention of claim 11 wherein at least three indicators are provided.

13. The invention of claim 11 wherein at least more than three indicators are provided.

* * * * *